(12) United States Patent
Reimer et al.

(10) Patent No.: US 6,691,861 B2
(45) Date of Patent: Feb. 17, 2004

(54) AUGER DISCHARGE CHUTE WITH DRIBBLE DOOR

(75) Inventors: Mark J. Reimer, Davenport, IA (US); Mark C. DePoorter, Rock Island, IL (US); Garrick W. Herbst, Bettendorf, IA (US); Edwin M. Gerber, Hooppole, IL (US); Lawrence P. Begyn, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/003,976

(22) Filed: Oct. 25, 2001

(65) Prior Publication Data

US 2003/0079956 A1 May 1, 2003

(51) Int. Cl.7 ........................ B65G 47/04; B65G 47/19; B65G 47/34
(52) U.S. Cl. ........................ 198/534; 198/550.2; 193/22
(58) Field of Search ................... 198/534, 548, 198/550.2, 550.4; 193/12, 22, 23, 25 A, 30

(56) References Cited

U.S. PATENT DOCUMENTS

| | | |
|---|---|---|
| 929,514 A | 7/1909 | Tenold et al. |
| 1,505,188 A | 8/1924 | Burns et al. |
| 1,615,334 A | 1/1927 | MacGregor |
| 1,847,433 A | 3/1932 | Krause |
| 2,487,693 A | 11/1949 | Canon |
| 2,551,461 A | 5/1951 | Pool et al. |
| 2,818,163 A | 12/1957 | Hilblom et al. |
| 3,278,054 A | * 10/1966 | Stott .......................... 193/12 |
| 3,447,669 A | 6/1969 | Mayrath |
| 4,104,812 A | * 8/1978 | Stribiak, Jr. ............... 37/243 |
| 4,334,603 A | * 6/1982 | Carter et al. .............. 193/32 |
| 4,540,086 A | 9/1985 | David et al. |
| 4,569,432 A | * 2/1986 | Zentgraf et al. ........... 193/32 |
| 4,862,607 A | * 9/1989 | Wacker ...................... 37/260 |
| 5,108,249 A | * 4/1992 | Kinzenbaw et al. ...... 414/523 |
| 5,348,138 A | 9/1994 | Seeman |

OTHER PUBLICATIONS

"New" Spill Saver; Jet Marketing, A division of Terry's Agir Sales, Belgrade, NE ad.

* cited by examiner

Primary Examiner—Christopher P. Ellis
Assistant Examiner—Gene O. Crawford

(57) ABSTRACT

A discharge chute for the unloading auger of a combine is provided with a discharge opening which provides maximum discharge flow rate and maximum clearance for moving and positioning of the auger. The discharge chute has an upper surface extending downwardly at a first angle relative to a horizontal plane, and a lower surface extending downwardly in a second angle relative to a horizontal plane. The first angle of the upper surface is greater than the second angle of the lower surface. The discharge chute also includes an internally mounted dribble door pivotal between raised and lowered positions. The door prevents grain dribble when in the upper position, and allows unobstructed grain discharge when in the lowered position.

22 Claims, 5 Drawing Sheets

AUGER DISCHARGE CHUTE WITH DRIBBLE DOOR

BACKGROUND OF THE INVENTION

Augers, such as unloading augers on a combine, are used to unload grain from the combine storage compartment to an adjacent grain cart or wagon. Typically, the grain is discharged from a cutout portion on the bottom surface of the auger housing. However, this location of the discharge opening on the bottom surface of the auger results in a lower elevation, as compared to a discharge opening at the terminal end of the auger housing. Thus, it is desirable to move the discharge opening to a higher elevation at the end of the unloading auger.

Also, combine unloading augers normally retain a small amount of grain in the housing after the unloading cycle is completed. The grain retained in the auger tends to slowly dribble out of the auger as the combine is transported in the field or along a road. Such loss of grain is undesirable. Thus, it is desirable to have an anti-dribble device that prevents grain dribble when the flow of discharging grain subsides or stops.

Accordingly, a primary objective of the present invention is the provision of an improved discharge chute for an unloading auger of a combine.

Another objective of the present invention is the provision of a dribble door adjacent the discharge end of the unloading auger of a combine to prevent grain dribble when the combine is transported.

A further objective of the present invention is the provision of a discharge chute having an upper surface terminating at a first angle for downward product discharge, and having a lower surface terminating in a second angle for downward product discharge, with the first angle being greater than the second angle relative to a horizontal plane.

Another objective of the present invention is the provision of a dribble door adjacent the discharge end of an unloading auger for a combine, wherein the dribble door is pivotally mounted inside a tubular chute for movement between raised and lowered positions.

Another objective of the present invention is the provision of a dribble door having opposite curved sides to matingly engage the discharge chute of the auger when in the raised position, and a laterally curved surface to matingly engage the discharge chute of the auger when in the lowered position.

Another objective of the present invention is the provision of a dribble door in the discharge chute of an unloading auger of a combine wherein the dribble door is normally biased to a raised position.

Still another objective of the present invention is the provision of an unloading auger for a combine having a dribble door with a straight hinge edge for pivotally mounting the dribble door to the discharge chute of the auger.

These and other objectives will become apparent from the following description of the invention.

BRIEF SUMMARY OF THE INVENTION

A discharge chute with a dribble door is provided for the unloading auger of a combine. The discharge chute includes a tubular member having a first end adapted to be mounted to the discharge end of the auger, and an opposite second end through which grain is discharged. The tubular member had an upper surface terminating at a first angle for downward product discharge, and a lower surface terminating at a second angle for downward product discharge. The first angle of the discharge chute is greater than the second angle, relative to a horizontal plane.

A dribble door is mounted inside the tubular member of the discharge chute for pivotal movement between raised and lowered positions. The dribble door includes opposite curved edges that matingly engage or seal with the internal wall of the tubular member when the door is in the raised position. The dribble door also has a laterally curved surface adapted to matingly engage the lower surface of the tubular member of the discharge chute when the door is moved to the lowered position. A spring biased hinge mounts the dribble door to the tubular member of the discharge chute to normally urge the dribble door to the raised position.

DETAILED DESCRIPTION OF THE INVENTION

Figure 6:
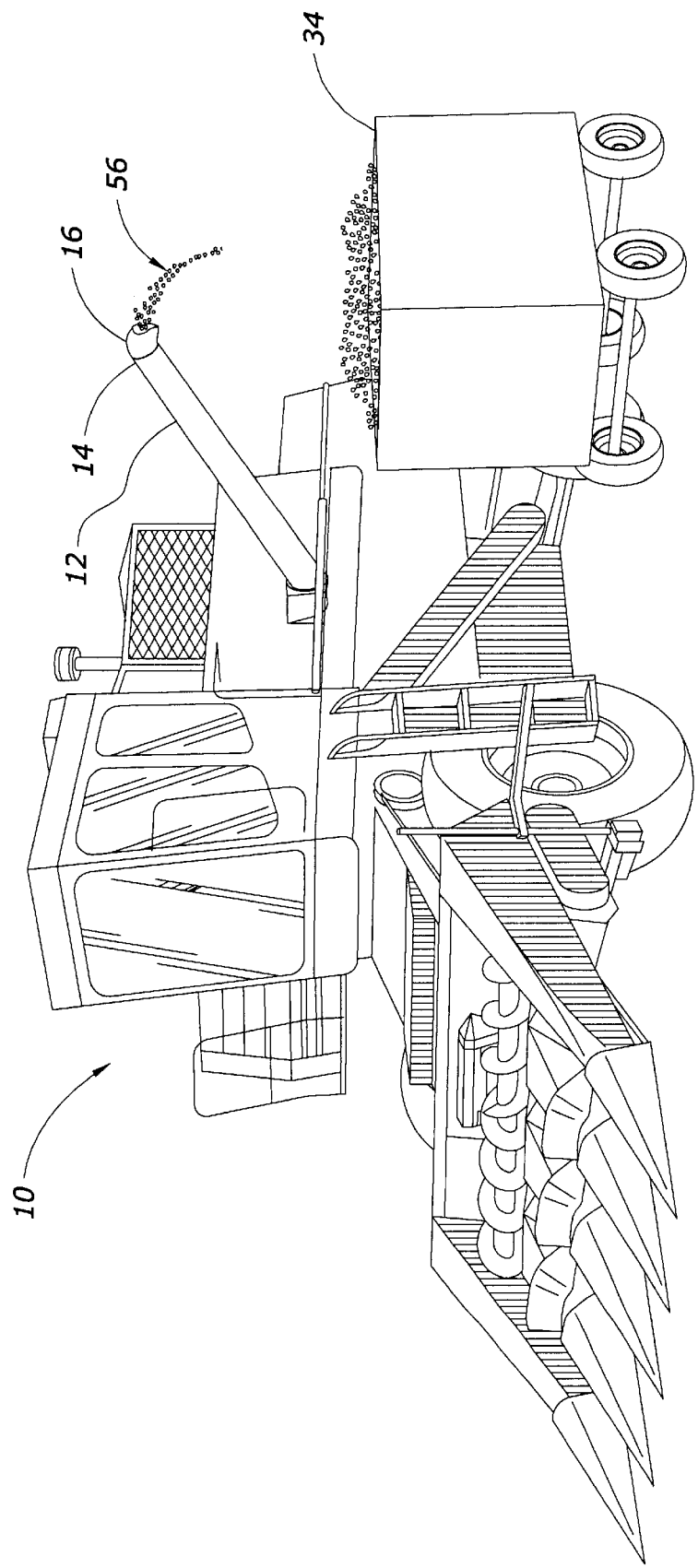
FIG. 6 is a perspective view of a combine having an unloading auger with the discharge chute of the present invention mounted thereon.

A conventional combine 10 includes an unloading auger 12, as seen in FIG. 6. The auger 12 has an inlet end extending into the combine 10 for receipt of grain from the grain storage compartment of the combine. The auger 12 also has an opposite grain discharge end 14. The combine 10 and the auger 12 are conventional, and do not constitute a part of the present invention.

Figure 2:
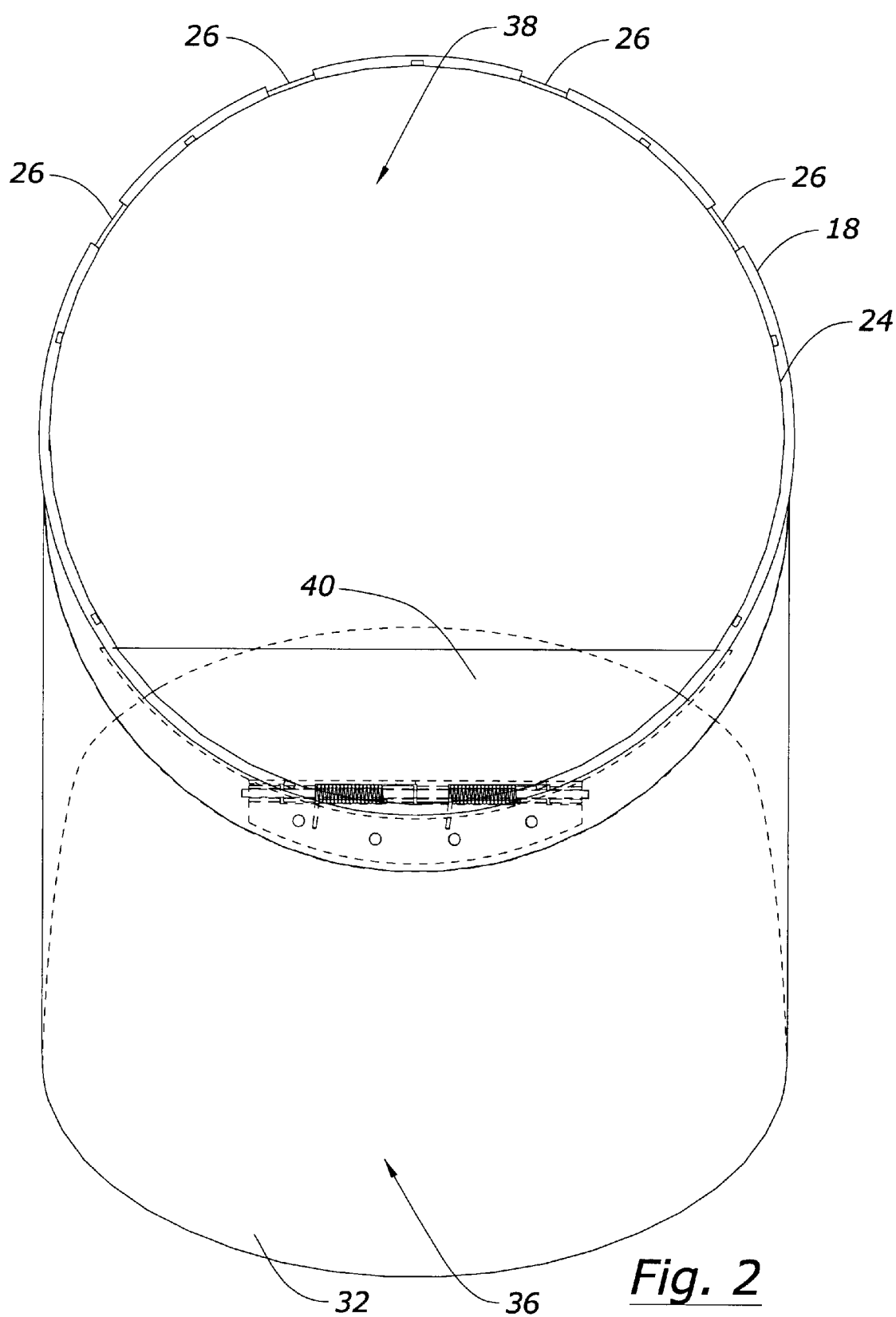
FIG. 2 is a rear elevation view of the discharge chute taken along lines 2—2 of FIG. 1.

The present invention is directed towards a discharge chute 16 that is mounted onto the discharge end 14 of the unloading auger 12. Preferably, the chute 16 is made of hardened plastic, but other materials, including metal, may be used. The discharge chute 16 generally is a downwardly curved tubular member having opposite first and second ends 18, 20. As seen in FIG. 2, the first end 18 is round in cross-section for mating engagement with the discharge end 14 of the unloading auger 12. The first end 18 includes a collar 22 which preferably is slightly smaller in diameter than the discharge end 14 of the auger 12, such that the collar 22 will slip fit into the discharge end 14 of the auger 12. A bead 24 extends around the collar 22 to provide a friction fit with the inside of the discharge end 14 of the auger 12. Slots 26 are provided in the collar 22 to allow the collar to deflect slightly to facilitate the mounting of the discharge chute 16 onto the auger 12. Holes 28 in the collar 22 are adapted to receive fasteners, such as screws, bolts, or pins, extending through the discharge end 14 of the auger to secure the discharge chute 16 to the auger 12.

Figure 1:
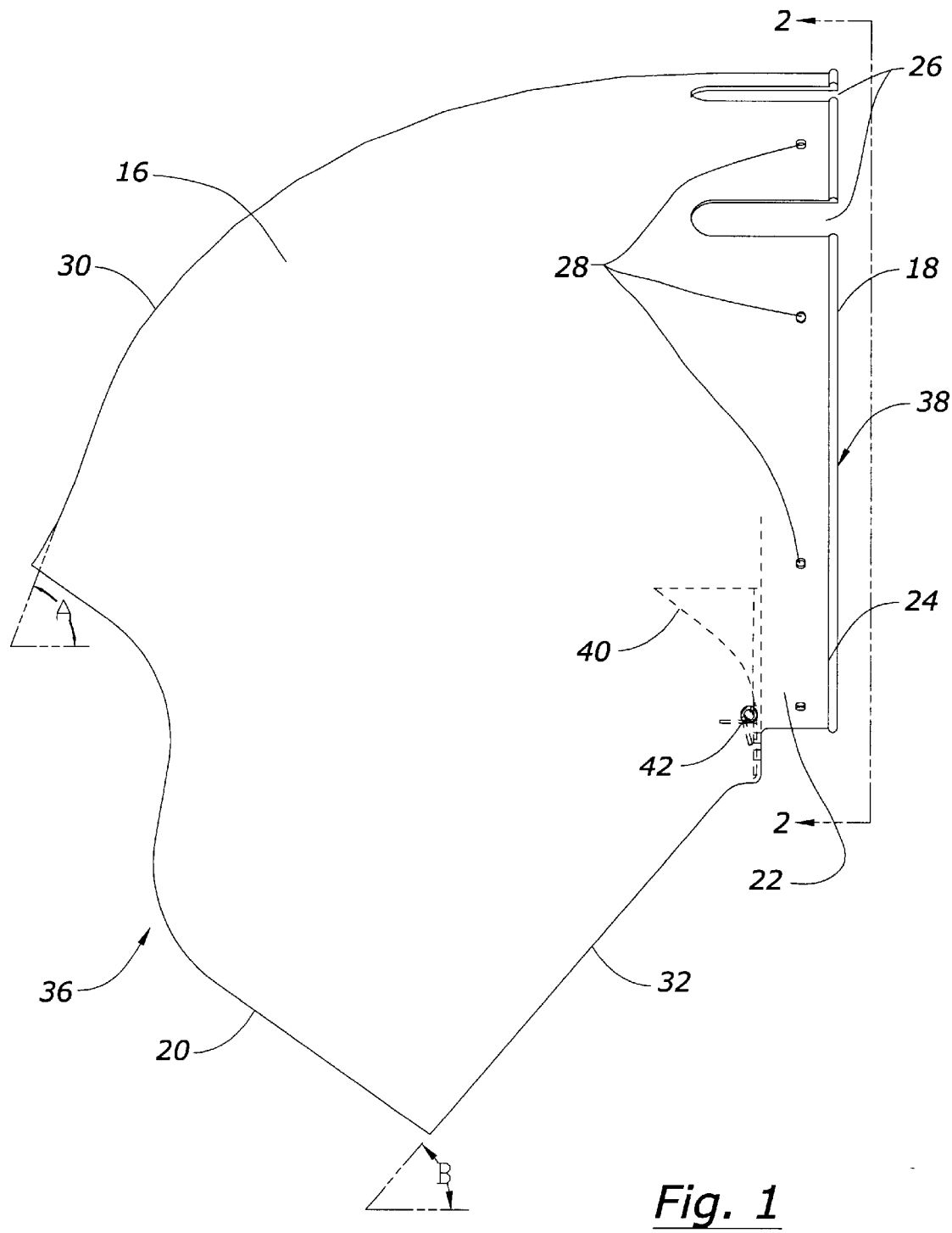
FIG. 1 is an enlarged side elevation view of the discharge chute with the dribble door of the present invention.

The tubular member that forms the discharge chute 16 has a curved upper surface 30 that terminates at a first angle A relative to a horizontal plane. The tubular member has a lower surface 32 that terminates in a second angle B relative to horizontal plane. Angles A and B are shown in FIG. 1 of the drawings. Angle A is greater than angle B such that the upper surface 30 directs the discharging grain downwardly, and the lower surface 32 allows maximum shedding of the discharged grain. Preferably, the lower surface 32 is substantially flat so as to provide maximum clearance beneath the discharge chute 16 when a grain cart or wagon 34 is moved into position beneath the auger 12, as seen in FIG. 6.

As angle B increases, clearance beneath the discharge chute 16 decreases. Also, as angle B decreases, the height of the discharge opening 36 of the discharge chute 16 decreases. As seen in FIGS. 1 and 2, since the upper and lower surfaces, 30, 32 of the discharge chute 16 are not parallel to one another, the cross-sectional shape of the discharge opening 36 does not remain round, as at the first end 18 of the chute 16. Since angle A is greater than angle B, the height of the discharge opening 36 at the second end 20 of the discharge chute 16 is less than the height of the inlet opening 38 on the first end 18 of the chute 16, as seen in FIG. 2.

While the lower surface 32 is shown in FIG. 1 to be substantially flat or linear, it is understood that the lower surface 32 alternatively could be curved, while maintaining a discharge angle B less than the discharge angle A of the upper surface 30.

The discharge chute 16 includes a dribble door 40 mounted inside the tubular member. As best seen in FIG. 1, the dribble door 40 is mounted in the discharge chute 16 adjacent the first end 18 thereof by a hinge 42. The hinge 42 includes a spring 44 such that the dribble door is pivotal between a raised position, shown in FIG. 1, and a lowered position. The spring 44 normally biases the door 40 to the upward position. The hinge 42 is defined by a hinge plate 46 mounted to the discharge chute 16 in any convenient manner, the aligned hinged tubes 48, 50 on the hinge plate 46 and dribble door 40, respectively, and the hinge pin 52 extending through the tubes 48, 50.

Figure 3:
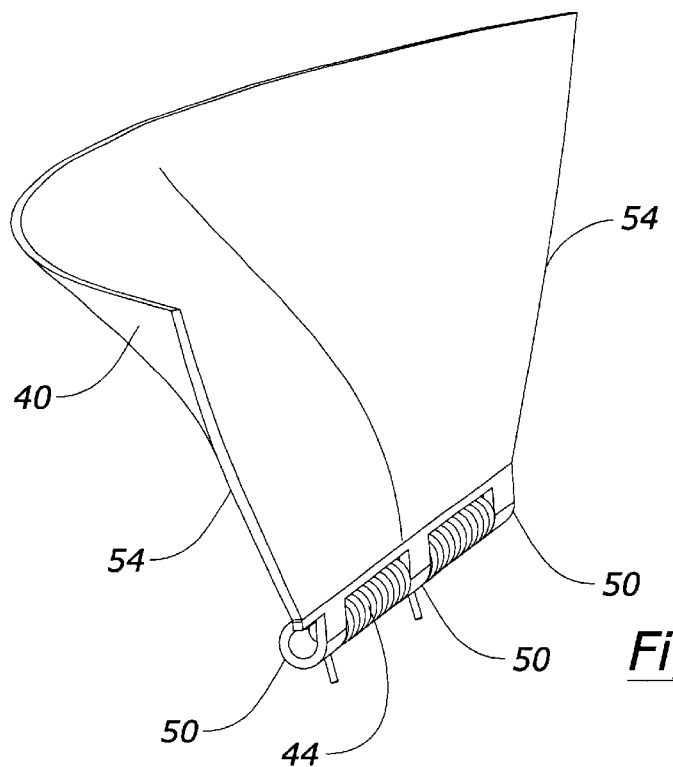
FIG. 3 is a perspective view of the dribble door of the present invention.
Figure 4:
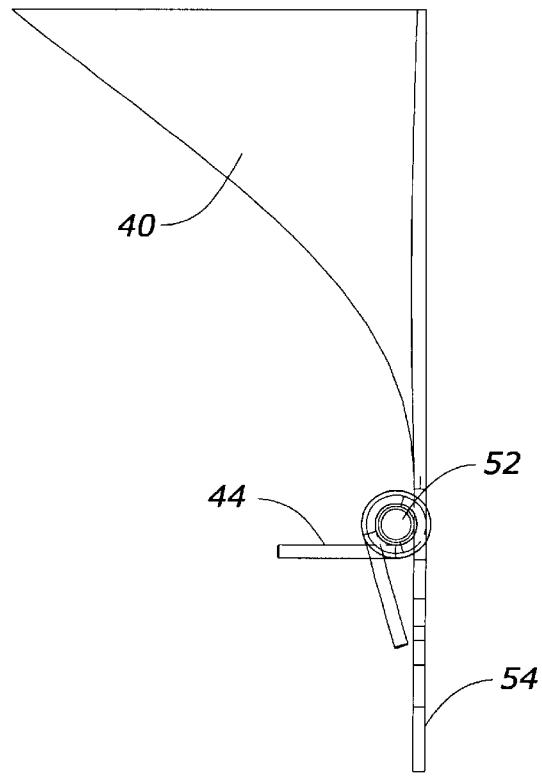
FIG. 4 is a side elevation view of the dribble door of the present invention.
Figure 5:
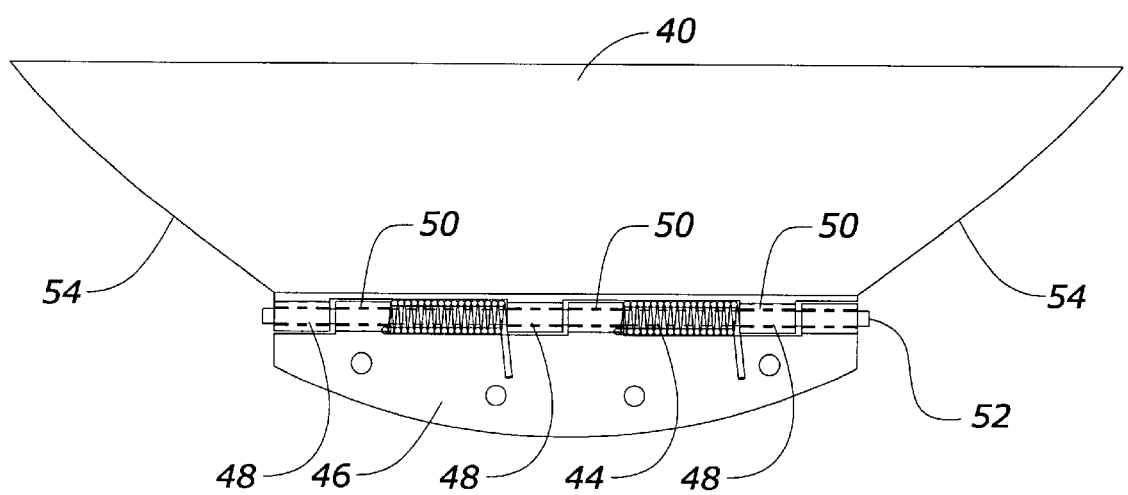
FIG. 5 is a front elevation view of the dribble door of the present invention.

The dribble door 40 has opposite sides 54 which are curved upwardly, as seen in FIG. 5, so as to matingly engage a portion of the side wall of the discharge chute 16 when the dribble door 40 is in the upright position. The dribble door 40 is also curved from side to side, as best seen in FIG. 3, so as to matingly engage the lower surface 32 of the discharge chute 16 when the door 40 is moved to the lowered position.

In use, the discharge chute 16 directs grain 56 being discharged from the unloading auger 12 downwardly into the grain cart 34. The discharging grain 56 pivots the dribble door 40 downwardly such that the door does not obstruct the flow of the discharging grain 56. When the auger 12 is turned off such that there is no rotation of the internal flighting (not shown), flow of the grain 56 ceases, such that the dribble door 40 is returned to its upright position by the bias of the spring 44. Thus, the door 40 prevents grain dribble when the auger 12 is not actuated, for example when the combine 10 is moving through the field or being transported along a road.

Whereas the invention has been shown and described in connection with the preferred embodiment thereof, it will be understood that any modifications, substitutions, and additions may be made which are within the intended broad scope of the following claims. From the foregoing, it can be seen that the present invention accomplishes at least all of the stated objectives.

What is claimed is:

1. A discharge chute for an auger, the auger having an inlet end and a discharge end, the chute comprising:
    a tubular member having a first end adapted to be mounted on the discharge end of the auger;
    a dribble door pivotally mounted adjacent to the discharge end of the auger and inside the tubular member for movement between raised and lowered; and
    a spring to normally urge the dribble door to the raised position.

2. The discharge chute of claim 1 wherein the dribble door is mounted adjacent the first end of the tubular member.

3. The discharge chute of claim 1 wherein the dribble door is mounted upstream from the second end of the tubular member.

4. The discharge chute of claim 1 wherein the dribble door has a curved surface to matingly engage an adjacent surface in the tubular member.

5. The discharge chute of claim 1 wherein the dribble door has a curved surface so as to matingly engage the tubular member when in the lowered position.

6. The discharge chute of claim 1 wherein the dribble door has opposite curved edges to matingly engage the tubular member when in the raised position.

7. The discharge chute of claim 1 wherein the tubular member has opposite inlet and outlet openings, with the inlet opening having a height greater than the height of the outlet opening.

8. The discharge chute of claim 1 further comprising the tubular member having an upper surface terminating at a first angle for downward product discharge, the tubular member having a lower surface terminating at a second angle for downward product discharge, and the first angle being greater than the second angle relative to a horizontal plane.

9. The discharge chute of claim 8 wherein the upper surface of the tubular member is curved.

10. The discharge chute of claim 8 wherein the lower surface of the tubular member is substantially flat.

11. The discharge chute of claim 8 wherein the second end of the tubular member is wider adjacent the lower surface than adjacent the upper surface.

12. A discharge chute for an auger, the auger having an inlet end and a discharge end, the chute comprising:
    a tubular member having a first end adapted to be mounted on the discharge end of the auger; and
    a dribble door pivotally mounted inside the tubular member for movement between raised and lowered positions,
    wherein the dribble door has a curved surface to matingly engage an adjacent surface in the tubular member.

13. The discharge chute of claim 12 wherein the dribble door is mounted adjacent the first end of the tubular member.

14. The discharge chute of claim 12 wherein the dribble door is mounted upstream from a second end of the tubular member.

15. The discharge chute of claim 12 further comprising a spring to normally urge the dribble door to the raised position.

16. The discharge chute of claim 12 wherein the dribble door has a curved surface so as to matingly engage the tubular member when in the lowered position.

17. The discharge chute of claim 12 wherein the dribble door has opposite curved edges to matingly engage the tubular member when in the raised position.

18. The discharge chute of claim 12 wherein the tubular member has opposite inlet and outlet openings, with the inlet opening having a height greater than the height of the outlet opening.

19. The discharge chute of claim 12 wherein the tubular member has an upper surface terminating at a first angle for downward product discharge, the tubular member having a lower surface terminating at a second angle for downward product discharge, and the first angle being greater than the second angle relative to a horizontal plane.

20. The discharge chute of claim 19 wherein the upper surface of the tubular member is curved.

21. The discharge chute of claim 19 wherein the lower surface of the tubular member is substantially flat.

22. The discharge chute of claim 19 wherein a second end of the tubular member is wider adjacent the lower surface than adjacent the upper surface.

* * * * *